3,219,619
LIQUID HYDROCARBON THICKENED WITH t-BU-
TYL STYRENE INTERPOLYMERS CONTAINING
METAL CARBOXYLATE GROUPS
Richard T. Dickerson, Midland, Mich., assignor to The
Dow Chemical Company, Midland, Mich., a corpora-
tion of Delaware
No Drawing. Filed Nov. 9, 1960, Ser. No. 68,157
13 Claims. (Cl. 260—33.6)

The present invention relates to thickeners for non-polar solvents comprising aliphatic or cycloaliphatic hydrocarbons and more particularly it concerns thickened compositions comprising such non-polar solvents and a minor proportion of a metal salt of certain polymeric polycarboxylic acids containing a major proportion of tertiary-butylstyrene.

It is a principal object of the present invention to provide novel thickening agents for aliphatic and cycloaliphatic hydrocarbons. Further objects are to provide thickening agents that can be formed in situ within such non-polar solvents and to provide homogeneous thickened compositions. Another object is to provide thickening agents that are highly effective at relatively low concentrations in achieving a given thickening effect. A further object of the invention concerns providing means for increasing the viscosity of such non-polar solvents over wide temperature ranges. A still further object is to provide means for gelling such non-polar solvents. Other objects will become apparent hereinafter as the invention is more fully described.

It has been discovered that in accordance with the invention, compositions comprising at least a major proportion of either or both aliphatic and cycloaliphatic hydrocarbons are thickened by incorporating into them as a solute a minor proportion of a mono- or polyvalent metal salt of a lipophilic, linear polymeric polycarboxylic acid comprising in a chemically combined form a major proportion of tertiary-butylstyrene, said polymeric polycarboxylic acid having from about 0.05 to about 3 carboxyl groups per 100 combined monomer units.

Incorporation of such metal polymeric polycarboxylates into the non-polar solvents to be thickened can be achieved in any convenient manner such as directly dispersing them into the solvent. However, it is most advantageous to form the metal salts of the polymeric polycarboxylic acids in situ within the non-polar solvent to be thickened. In carrying out the invention in the latter manner, a suitable quantity of a lipophilic, linear polymeric-polycarboxylic acid of the invention is dissolved in the non-polar solvent to be thickened and while therein, brought into and maintained in the presence of an effective quantity of a mono- or polyvalent metal cation or mixture of such cations. An "effective quantity" refers to a metal ion concentration at which significant thickening is obtained. Usually, a significant thickening effect is achieved by incorporating a sufficient amount of the metal ions employed to form at least about 0.05 metal carboxylate groups per 100 combined monomer units in the polymeric polycarboxylic acid.

The quantities of the metal cation employed and its valence state are important variables having a pronounced influence upon the extent and character of the thickening that is achieved, e.g., increase in viscosity or gelation of the aliphatic non-polar solvent. Another factor of considerable importance in controlling the thickening effect of the invention is the frequency of occurrence of the carboxyl group on the polymeric chain. By manipulation of these variables, it is possible to increase the viscosity of non-polar solvents or to form gels therefrom with small quantities of the metal polymeric polycarboxylates of the invention over wide temperature ranges.

Hereinafter, for the purposes of this specification and the appended claims, the terminology "non-polar solvent" shall comprehend aliphatic hydrocarbons, cycloaliphatic hydrocarbons and mixtures thereof.

Aliphatic hydrocarbons operable in the invention include compounds that may be either branched or linear such as propane, butane, pentane, hexane, heptane, octane, nonane, decane, dodecane, propene, butene, 1,3-butadiene, isoprene and the like saturated and unsaturated aliphatic hydrocarbons. Exemplary of the cycloaliphatic hydrocarbons that can be thickened in accordance with the present invention are cyclopentane, 1,1-dimethyl cyclopentane, 1,3-dimethyl cyclopentane, cyclohexane, methyl cyclohexane, ethyl cyclohexane, 2,4-dimethyl cyclohexane and the like cycloaliphatic hydrocarbons.

Other non-polar solvents that may be employed are mixtures comprising essentially one or more materials of the foregoing classes of solvents such as may be obtained by the distillation or alkylation of petroleum stocks. Examples of such are petroleum ether, gasoline, kerosene, benzine, ligroin, motor oil and the like.

Most of the above-specified non-polar solvents are normally liquid at room temperatures. Liquidity at normal temperatures, however, is not a requirement for operability as good results can be obtained in accordance with the present invention in liquefied gases or in melts of solids that are obtained at temperatures below that temperature which is the upper limit of thermostability for the metal polymeric polycarboxylate employed.

The polymeric polycarboxylic acids that are employed in the present invention to form the metal polymeric polycarboxylates are non-crystalline, lipophilic, i.e., oil soluble, linear polymers. As employed herein, the term "linear" refers to the absence of substantial cross-linking between polymer chains but does not preclude the inclusion of graft copolymers or branched linear polymers. Essential requisites for operability of the polymeric polycarboxylic acids are that they be miscible with the non-polar solvent to be thickened and contain from about 0.03 to about 3 pendant carboxyl groups per 100 combined monomer units. Such polymeric acids comprise relatively few polar or hydrophilic foci such as amine, amide, carbonyl or ether linkages, or such substituents as hydroxyl or oxy-acid groups, in addition to the required free carboxyl groups, that are not offset by large lipophilic hydrocarbon groups attached thereto which render the resulting combination oil soluble. Miscibility can be simply ascertained by stirring a small quantity of about 5 to 10 percent or so by weight of the polymeric acid into the solvent to be thickened and observing whether or not a visually continuous or homogeneous solution is obtained. The polymeric polycarboxylic acids must also be characterized by an average degree of polymerization of at least about 70 to about 4000 monomer units per polymer molecule depending upon the minimum degree in the range that is sufficient to provide an average of at least about 2 carboxyl groups per polymer molecule.

The polymeric polycarboxylic acids can be prepared, for example, by copolymerizing tertiary-butylstyrene or a mixture of ethylenically unsaturated, lipophilic monomers comprising a major proportion of tertiary-butylstyrene with a suitable quantity of an ethylenically unsaturated monomer containing a monocarboxylic acid group or a group that is convertible subsequent to polymerization to the desired carboxyl group such as ester, acyl halide, amide, nitrile and the like groups which can be hydrolyzed to provide carboxyl groups or formyl, methylol, aminomethyl, halomethyl and the like groups which can be oxidized to provide carboxyl groups.

Ethylenically unsaturated lipophilic monomers that can be employed with exceptional advantage along with the tertiary-butylstyrene are the oil-soluble, ethylenically unsaturated hydrocarbons and halo-substituted hydrocarbons which can be either aliphatic or aromatic.

Exemplary of such lipophilic monomers are propylene, butylene, styrene, ar-ethyl styrene, ar-propyl styrene, ar-vinyl toluene, ar-vinyl xylene, ar-vinyl mesitylene, ar-bromo styrene, ar-chloro styrene, ar-dichlorostyrene, ar-trichlorostyrene and the like aliphatic and aromatic, substituted and unsubstituted olefins. Similarly operable are the α-alkyl-substituted aromatic olefins such as α-methyl styrene and the like.

Examples of polymerizable ethylenically unsaturated monocarboxylic acids that may be incorporated into the polymeric polycarboxylic acids by direct or graft polymerization techniques include acrylic, methacrylic, α-chloroacrylic, α-bromoacrylic, α-phenylacrylic, α-propylacrylic, α-butylacrylic, α-cyclohexylacrylic, α-octylacrylic, vinylbenzoic and the like unsaturated monocarboxylic acids. It should be understood that the esters and salts of the foregoing acids, which can be saponified and subsequently acidified, or simply acidified as the case need be to provide the free acids, are also operable. Similarly, acyl halides, nitriles and amides of the foregoing acids can also be hydrolyzed after polymerization to provide the necessary carboxylic acid functionality. Aldehydes, primary alcohols, primary alkyl halides, amines and the like that can be oxidized to provide carboxylic acid functionality include, for example, acrolein, vinylbenzyl alcohol, vinylbenzylchloride, vinylbenzylamine and the like.

The polymeric polycarboxylic acids of the invention are prepared by known means. For example, the ethylenically unsaturated lipophilic monomers and the carboxyl containing or providing monomers are brought together within a suitable reaction medium and in the presence of a suitable polymerization catalyst in proportions sufficient to provide the desired amount of carboxyl groups or groups which are convertible to carboxy groups in the resulting polymerized product. Catalysts for the reaction may be any one or more of such reaction initiating means as heat, light, high energy radiation and free radical-providing chemical catalysts. Suitable catalysts of the latter category include such peroxidic materials as the alkali metal and ammonium persulfates and perborates, hydrogen peroxide, organic peroxides and hydroperoxides such as benzoyl peroxide, tertiary-butyl hydroperoxide, tertiary-butyl perbenzoate and the like. Other suitable catalysts of the latter category include the azo materials such as azobisisobutyronitrile. United States Letters Patent 2,723,261 also sets forth methods for preparing the tertiary-butylstyrene monomer and methods for copolymerizing vinyl-type monomers therewith. The amount of the ethylenically unsaturated carboxylic acid monomer, or monomer that is susceptible of treatment such as saponification, acidification, hydrolysis or oxidation to provide the desired carboxyl groups, employed is sufficient to provide the desired frequency of pendant carboxylic acid groups in the resulting copolymer. The polymeric polycarboxylic acids of the invention contain pendant carboxyl groups at a frequency of from about 0.05 to about 3 carboxyl groups for each 100 combined monomer units.

The metal cations that are employed are the mono-, di- and trivalent ions of metals that form salts with strong mineral acids such as hydrochloric, sulfuric, nitric and chloric acids, with such salts being ionizable to provide ions that are not subject to spontaneous oxidation or reduction, i.e., having a stable valence state, in aqueous media.

Whether mono- or polyvalent cations are employed to form the polymeric polycarboxylates varies according to the particular thickening effect desired. The monovalent metal salts provide an especially advantageous and sensitive means for increasing and controlling the viscosity of the above-described non-polar solvents. The polyvalent metal polymeric polycarboxylates have a more pronounced thickening effect and thereby provide means of gelling non-polar solvents.

Monovalent alkali metal derived cations such as those obtained from lithium, sodium, potassium and the like are employed in the invention when controllable increases in viscosity of the specified non-polar solvents are desired. The polyvalent metal cations of which representative examples are derived from the alkaline earth metals such as magnesium, calcium, barium and the like and such other polyvalent metals as zinc, iron, copper, lead and aluminum, are employed to form gels or, in a few instances, very viscous solutions that approximate gels. In all instances, i.e., with both the mono- and polyvalent cations, the thickening action of the polymeric metal polycarboxylates is reversible. This means that the solvent can be separated from the polymeric acid salt and that the same polymeric material can be redissolved in the same or another appropriate non-polar solvent to achieve a thickening effect. However, while it is thus possible to first prepare the polymeric polycarboxylic acid salts and then dissolve them in the non-polar solvent to be thickened, to achieve a particular thickening effect, the in situ formation of the salts permits better control of the resulting thickening effect. Also, thickening is obtained at an equilibrium state much more quickly when the salts are formed in situ.

The alkali polymeric polycarboxylates of the invention can be prepared in situ by contacting the polymeric polycarboxylic acid in a non-polar solvent solution thereof with an alkali metal oxide or alkali metal hydroxide. For example, having prepared a solution of a suitable quantity of the polymeric polycarboxylic acid in the non-polar solvent, an aqueous solution of an alkali hydroxide is thoroughly mixed into the non-polar solvent solution with sufficient agitation to form a water-in-oil emulsion. In this manner, sufficient contacting of the polymeric polycarboxylic acids with the alkali cations is achieved to result in the in situ formation of the thickening salts. Since water is generally undesirable in the ultimately thickened composition, it is desirable to utilize highly concentrated aqueous solutions of the metal hydroxide that is employed.

It has been discovered, however, that exceptional results can be obtained in accordance with the following procedure for forming any of the metal polymeric polycarboxylates in situ within the non-polar solvent to be thickened.

As in the above-described procedure, a solution of the polymeric polycarboxylic acid is prepared in the non-polar solvent. A metal salt which is soluble in and preferably dissolved in part of the solvent to be thickened and which comprises the metal cation in combination with the conjugate anion of an organic acid weaker than the polymeric polycarboxylic acid is then added to the non-polar solvent solution of the polymeric polycarboxylic acid in an amount sufficient to cause a desired increase in the solution's resistance to flow. The above term "weaker" means that the anion of the weak organic acid must have the ability to deprotonate the pendant carboxylic acid groups of the polymeric polycarboxylic acid. The term "acid" is employed in the foregoing in the broad sense as including those compounds capable of having a hydrogen atom replaced by a metal atom.

It should be noted that the order in which the polymeric polycarboxylic acid and the metal salt of the weak organic acid are added to the non-polar solvent to be thickened is not critical. Any convenient means of achieving such a solution may be employed which includes adding either or both of the reactants to the non-polar solvent to be thickened as dry powders or in a solution miscible with the non-polar solvent.

Weak organic acids that can be employed include the oil-soluble alkanols, alkylcarbonates, alkyl and aryl mercaptans, alkyl and aryl sulfites and the like weak organic acids that do not form a stable complex with the metal ion being employed as would, for example, a chelating agent, e.g., acetylacetone. Generally, alkyl chains of at least about 4 carbon atoms are needed to impart the necessary oil solubility to the foregoing weak organic acids such as the alkanols. However, it is preferred that such alkyl chains contain 8 or more carbon atoms. Specific examples of operable weak organic acids are octanol, 2-octylcarbonic acid, methylcarbonic acid, dodecylcarbonic acid, octyl mercaptan, 2-octylsulfurous acid and phenylsulfurous acid.

Weak organic acids that have been found to be highly effective in the invention are the alkyl-substituted phenols such as, for example, tertiary-butylphenol, octylphenol, dodecylphenol and the like. Alkali metal alkylphenolates can be prepared by mixing stoichiometric quantities of the metal, metal oxide, hydroxide or alcoholate with the alkylphenol in a solvent such as a lower alkanol. Certain other alkylphenolates such as those of magnesium can be prepared by reacting a metal alkoxide such as magnesium methoxide with the desired alkylphenol in the presence of an alkanol solvent. Alkylphenolates of most other metals such as those of copper, iron and lead can be prepared by a metathetical reaction in the presence of a solvent between a salt of the metal such as the chloride or bromide salts and an alkali metal alkoxide. The alkali metal salt by-product of this reaction, i.e., the corresponding chloride or bromide, being insoluble in the lower alkanol solvent, precipitates leaving the desired phenolate in solution.

The solvent is separated from the above-described reaction products by evaporation and the residue comprising the metal alkylphenolate is dissolved in a non-polar solvent, preferably the solvent that is to be thickened. This solution may then be filtered and made up to desired concentrations which can be determined, when precise control of this variable is desired, by simple volumetric titration with a standard acid.

The thickened non-polar solvent that is obtained in accordance with the foregoing procedure does not contain incorporated water or other impurities such as excess hydroxides or metal oxides which may result from entrainment in the previous method involving direct in situ treatment of the polymeric polycarboxylic acid with an aqueous hydroxide solution or a metal oxide. Other advantages of this method concern the precise control that can be obtained over the amount of metal cation that is in solution or, in effect, the extent of salt formation occurring in the dissolved polymeric polycarboxylic acid. The latter factor has a considerable bearing on the exact viscosity that is obtained and provides a convenient means for controlling the viscosity or gel formation.

The quantity of the metal cation incorporated into the non-polar solvent solution of the polymeric polycarboxylic acid solution is sufficient to achieve a chemical equivalence ratio, i.e., ratio of chemical equivalents of the metal cations for each chemical equivalent of carboxylic acid groups, that may range from about 0.1 to about 3. Above an equivalence ratio of about 3, the invention is still operative but the thickening effect is substantially less than the maximum effect obtainable at the specified lower equivalence ratios. Usually, a maximum thickening effect is accomplished within the range of equivalence ratios from about .9 to about 1.5.

In most applications, the desired thickening effect in the non-polar solvent can be achieved at a concentration of about 3 weight percent of the metal polymeric polycarboxylate, but as may be desired, thickening to a greater or lesser extent can be achieved with quantities of the polymeric acid salts from about 0.1 percent to as much as 10.0 percent or more based on the weight of the solvent.

The metal polymeric polycarboxylates of the invention are highly effective thickeners for the previously specified non-polar solvents. Such solvent and thickener combinations can be employed to great advantage in compositions where viscosity control or gelation is desired. A particular application in which the present invention can be employed with great advantage is in the manufacture of greases, which application, depending upon the purpose for which the greases are formulated, presents a wide variety of thickening requirements.

The following examples are given as further illustrations of the present invention but the invention should not be considered as being limited thereto.

EXAMPLE 1

A polymeric polycarboxylic acid was prepared by charging 74.2 grams of tertiary-butylstyrene and .74 gram of acrylic acid to a small ampoule placed in Dry Ice. The ampoule was sealed under vacuum while the contents therein remain frozen. The ampoule was then warmed to melt the contents, shaken to restore homogeneity and placed in a heated bath at 80° C. for 6 days, at the end of which time the ampoule was removed from the bath, cooled and broken away from the solid polymer. A portion of the above-prepared polymer weighing 3.5 grams was dissolved in 70 milliliters of normal hexane and to this solution was added dropwise ¼ molar solution of lithium dodecylphenolate in toluene until no further increase in viscosity resulted. The initially thin, oily liquid solution of the polymeric polycarboxylic acid was converted thereby to a viscous, molasses-like consistency.

EXAMPLE 2

Other tertiary-butylstyrene-acrylic acid copolymers were prepared in the manner of the foregoing example containing varying proportions of acrylic acid in chemically combined form. The polymers thus prepared were dissolved in varying concentrations in a commercial regular grade gasoline. Varying chemical equivalents of lithium cation were added to these solutions whereupon a substantial increase in viscosity occurred. The viscosity of the resulting compositions were measured by means of a Brookfield viscometer. The weight percent of the polymeric polycarboxylic acid in solution, the weight percent acrylic acid combined in the polymeric poly-acid, the chemical equivalence of lithium ions based on the carboxyl group functionality of the polymer and the resulting viscosity in centipoises are reported in Table 1.

*Table 1*

| Weight Percent Polymer in Gasoline | Weight Percent Acrylic Acid Combined in Polymer | $Li^+:CO_2H$ (Equivalence Ratio) | Viscosity (Centipoises) |
|---|---|---|---|
| 2 | 0.15 | 0.5 | 2,500 |
| 2 | 0.15 | 1.0 | 45,800 |
| 2 | 0.15 | 2.0 | 3,000 |
| 2 | 0.15 | 3.0 | 270 |
| 3 | 0.15 | 0.5 | 18,700 |
| 3 | 0.15 | 1.0 | 116,000 |
| 3 | 0.15 | 2.0 | 37,500 |
| 3 | 0.15 | 3.0 | 10,000 |
| 2 | 0.61 | 2.0 | 166 |
| 2 | 0.61 | 3.0 | 1,665 |
| 3 | 0.61 | 2.0 | 15,800 |
| 3 | 0.61 | 3.0 | 31,700 |
| 1 | 0.89 | 3.0 | 200 |
| 2 | 0.89 | 0.5 | 133 |
| 2 | 0.89 | 1.0 | 10,800 |
| 2 | 0.89 | 2.0 | 36,700 |
| 2 | 0.89 | 3.0 | 4,160 |
| 3 | 0.89 | 0.5 | 270 |
| 3 | 0.89 | 1.0 | 166,000 |
| 3 | 0.89 | 2.0 | 166,000 |
| 3 | 0.89 | 3.0 | 96,300 |
| 2 | 1.88 | 0.5 | 1,664 |
| 2 | 1.88 | 1.0 | 150 |
| 3 | 1.88 | 0.5 | 14,600 |
| 3 | 1.88 | 1.0 | 4,260 |
| 3 | 1.88 | 2.0 | 100 |

EXAMPLE 3

Tertiary-butylstyrene-acrylic acid copolymers were prepared in a manner similar to that of Example 1 containing 0.89 percent acrylic acid (Polymer "A") and 1.88 percent acrylic acid (Polymer "B"), respectively. Solutions were prepared containing 3 percent of these polymers in ethyl gasoline, "white" gasoline, kerosene and diesel fuel. The solutions were treated with one molar equivalent of lithium dodecylphenolate at 25° C. The resulting viscosities are reported in centipoises in Table 2.

*Table 2*

| Solvent | Viscosities | |
|---|---|---|
| | Polymer "A" | Polymer "B" |
| Ethyl gasoline | 9,000 | |
| White gasoline | a 111,000 | |
| Kerosene | 161,000 | 53,000 |
| Diesel fuel | 127,000 | b 58,000 | a 128,000 cps. at 0° C.; 126,000 cps. at 60° C.
b 117,000 cps. at 0° C.; 91,500 cps. at 60° C.

In a manner similar to that of the foregoing examples, other ethylenically unsaturated monocarboxylic monomers such as methacrylic, α-chloroacrylic, α-bromoacrylic, α-phenylacrylic, α-propylacrylic, α-butylacrylic, α-cyclohexylacrylic, α-octylacrylic, vinyl benzoic acid and the like can be substituted for the acrylic acid employed in the foregoing examples to achieve comparable results. Similarly, other metal salts of the tertiary-butylstyrene-acrylic acid copolymers such as the sodium, potassium, cesium, calcium, magnesium, zinc, iron, copper and lead salts can be substituted for the lithiumpolymeric polycarboxylates formed in the foregoing examples to provide thickened compositions.

What is claimed is:

1. A method for thickening a non-polar organic solvent selected from the group of non-polar organic solvents consisting of aliphatic hydrocarbons, cycloaliphatic hydrocarbons and mixtures of the foregoing, which method comprises admixing with said solvent in any order (A) at least 0.1 percent by weight of the non-polar organic solvent of a lipophilic, linear polymeric polycarboxylic acid corresponding to a copolymer of ethylenically unsaturated monomers of which a small proportion have monocarboxyl groups and containing in polymerized form a major proportion based on the total combined monomer units of tertiary-butylstyrene, said polymeric polycarboxylic acid being characterized by having an average of from about 0.05 to about 3 carboxyl groups per 100 combined monomer units and an average of at least 2 carboxylate groups per polymer molecule and (B) an effective quantity sufficient to thicken a mixture of the solvent and the polymeric polycarboxylic acid of a metal cation selected from the group of mono-, di- and trivalent ions of metals that form salts with at least one of the mineral acids selected from the group consisting of hydrochloric, sulfuric, nitric and chloric acids which salts are ionizable to provide metal ions that are characterized by a stable valence state in aqueous media.

2. A method as in claim 1 wherein a metal cation is added to the non-polar solvent in the form of a salt of a weak organic acid in which the organic counter anion has a greater affinity for a hydrogen ion than the conjugate carboxylate ion of the polymeric polycarboxylic acid, said salt of a weak organic acid being soluble in the non-polar solvent.

3. A method as in claim 1 wherein the metal cation is derived from an alkali metal.

4. A method as in claim 1 wherein the metal cation is derived from an alkaline earth metal.

5. A method as in claim 1 wherein the metal cation is added in the form of a metal alkylphenolate.

6. A method as in claim 1 wherein from about 0.1 to about 3 chemical equivalents of the metal cations are employed for each chemical equivalent of carboxylic acid groups present.

7. A thickened composition of matter comprising a non-polar organic solvent selected from the group consisting of aliphatic hydrocarbons, cycloaliphatic hydrocarbons and mixtures of the foregoing, and dissolved therein a minor proportion by weight sufficient to thicken said solvent of a metal salt of a linear lipophilic polymeric polycarboxylic acid corresponding to a copolymer of ethylenically unsaturated monomers of which a small proportion have monocarboxyl groups and a major proportion of the total combined monomer units tertiary butyl styrene, said polymeric polycarboxylate being characterized by having an average of from about 0.05 to about 3 metal carboxylate groups per 100 combined monomer units and an average of at least 2 carboxylate groups per polymer molecule, said metal salt-forming cation being selected from the group consisting of mono-, di- and trivalent ions of metals that form salts with at least one of the mineral acids selected from the group consisting of hydrochloric, sulfuric, nitric and chloric acids, which salts ionize to provide metal ions that are characterized by a stable valence state in aqueous media.

8. A composition as in claim 7 wherein the quantity of the metal polymeric polycarboxylate employed ranges from about 0.1 to about 10 percent by weight of the non-polar solvent.

9. A composition of matter as in claim 7 wherein the metal salt of the polymeric polycarboxylic acid is an alkali metal polymeric polycarboxylate.

10. A composition of matter as in claim 7 wherein the metal salt of the polymeric polycarboxylic acid is an alkaline earth metal polymeric polycarboxylate.

11. A thickened composition of matter comprising a non-polar organic solvent selected from the group consisting of aliphatic hydrocarbons, cycloaliphatic hydrocarbons and mixtures of the foregoing, having dissolved therein the reaction product of (A) a minor proportion by weight of a linear, lipophilic polymeric polycarboxylic acid corresponding to a copolymer of ethylenically unsaturated monomers of which a small proportion have monocarboxyl groups and containing in polymerized form a major proportion based on the total combined monomer units of tertiary butyl styrene, said polymeric polycarboxylic acid being characterized by having an average of from about 0.05 to about 3 carboxyl groups per 100 combined monomer units and an average of at least 2 carboxyl groups per polymer molecule, and (B) a metal salt of a weak organic acid wherein the anion is capable of deprotonating pendant carboxylic acid groups of the polymeric polycarboxylic acid and the metal cation is selected from the group consisting of mono-, di- and trivalent ions of metals that form salts with at least one of the mineral acids selected from the group consisting of hydrochloric, sulfuric, nitric and chloric acids, which salts ionize to provide metal ions that are characterized by stable valence states in aqueous media; the amount of component (B) employed being sufficient to provide about 0.1 to about 3 chemical equivalents of the metal cation for each chemical equivalent of the pendant carboxylic acid groups present.

12. A composition as in claim 11 wherein the metal salt of a weak organic acid is an alkali metal alkylphenolate.

13. A composition s in claim 11 wherein the metal salt of a weak organic acid is an alkali metal alkylcarbonate.

References Cited by the Examiner

UNITED STATES PATENTS 2,723,261  11/1955  Levine et al. _____ 260—29.6
3,046,259  7/1962  Hess et al. _____ 260—88.1

OTHER REFERENCES

Schildknecht: "Vinyl and Related Polymers," John Wiley and Sons, New York (1952), pages 301–306.

MORRIS LIEBMAN, *Primary Examiner.*

DANIEL ARNOLD, LEON J. BERCOVITZ, *Examiners.*